V. G. PAUTLER.
CAMERA.
APPLICATION FILED APR. 15, 1921.

1,428,395.  Patented Sept. 5, 1922.

Inventor
V. G. Pautler
By D. Swift
his Attorney

Patented Sept. 5, 1922.

1,428,395

UNITED STATES PATENT OFFICE.

VICTOR G. PAUTLER, OF FORT GAGE, ILLINOIS.

CAMERA.

Application filed April 15, 1921. Serial No. 461,541.

*To all whom it may concern:*

Be it known that I, VICTOR G. PAUTLER, a citizen of the United States, residing at Fort Gage, in the county of Randolph, State of Illinois, have invented a new and useful Camera; and I do hereby declare the following to be a full, clear, and exact description of the invention, such as will enable others skilled in the art to which it appertains to make and use the same.

The invention relates to cameras and has for its object to provide film rolls therefor, one of said rolls being a supply roll and the other roll an accumulation roll, and to provide ratchet means in connection with the accumulation roll, whereby retrograde movement of said roll will be prevented under normal conditions, and to provide means whereby the ratchet may be released if it is desired to work a portion of the film back onto the supply roller, for instance where a film has been inadvertently moved too far, for instance beyond the sight opening.

With the above and other objects in view the invention resides in the combination and arrangement of parts as hereinafter set forth, shown in the drawings, described and claimed it being understood that changes in the precise embodiment of the invention may be made within the scope of what is claimed without departing from the spirit of the invention.

In the drawings:—

Figure 2:
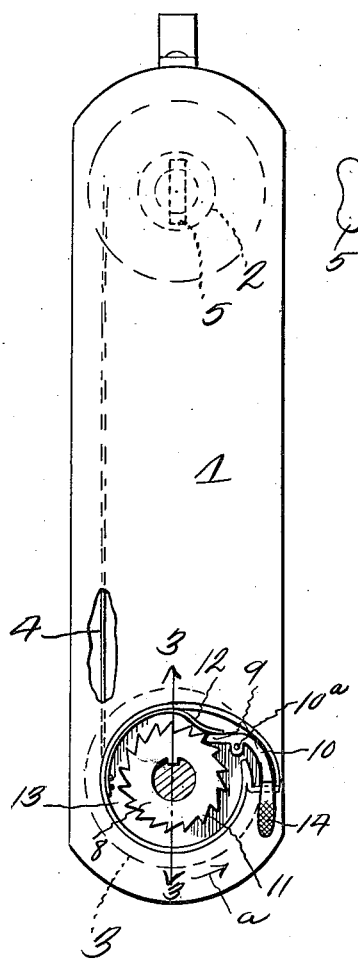
Figure 2 is a side elevation of the camera showing the ratcheting device for the accumulation roller.
Figure 1:
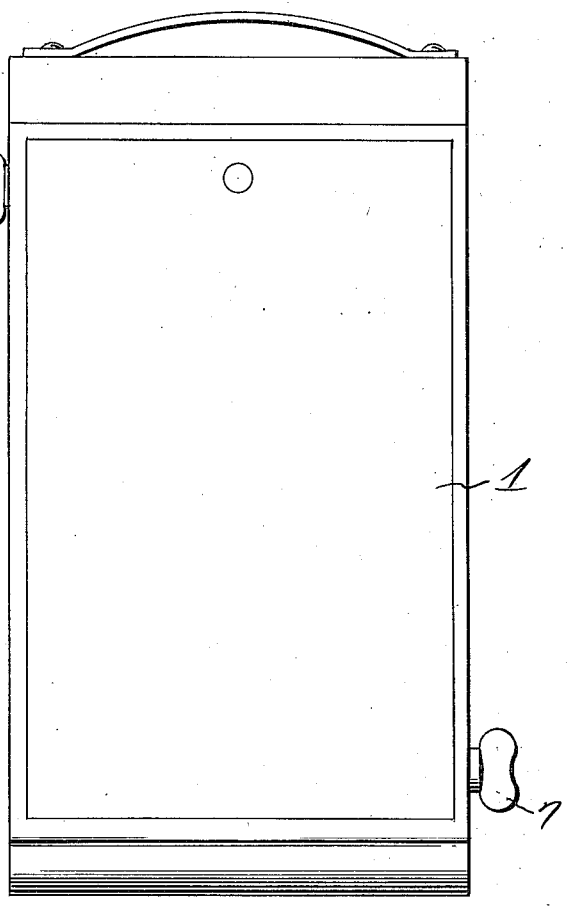
Figure 1 is a front elevation of a conventional form of camera, showing the device applied thereto.
Figure 3:
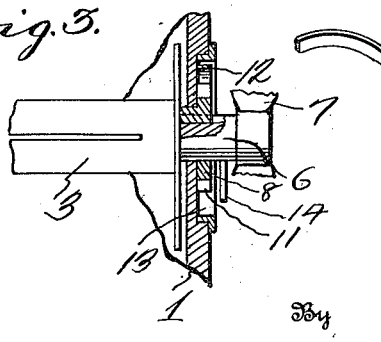
Figure 3 is a sectional view taken on line 3—3 of Figure 2.
Figure 4:
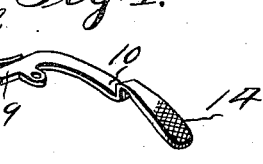
Figure 4 is a perspective view of the spring actuated dog for the ratchet.

Referring to the drawings, the numeral 1 designates a conventional form of folding camera, and 2 a film supply reel carried thereby. Also disposed within the camera 1 is a film accumulation roller 3, onto which roller the film 4 is rolled after exposures. A great difficulty now experienced in cameras of this type is that after a film has been moved too far in the direction of the accumulation roll, no provision is made for retrograde movement of the film in the direction of the supply roller. To obviate this difficulty the supply roller 2 is provided with a butterfly nut 5 by means of which nut a supply roller 2 may be rotated in the reverse direction. The pintle 6 of the accumulation roller 3 is provided with a finger engaging nut 7 by means of which nut the roller may be rotated in the direction of the arrow $a$, which action will cause the film 4 to feed from the supply roller 2 onto the accumulation roller 3. To prevent retrograde movement of the accumulation roller 3 during the feeding operation, said roller 3 is provided with a ratchet wheel 8, with which ratchet wheel the nose 9 of a dog 10 cooperates, said nose being held in engagement with the teeth 11 of the ratchet wheel 8 by means of a leaf spring 12. The ratchet wheel 8 and the dog 10, also leaf spring 12 are preferably disposed in a depression 13 in one side of the camera, however the dog 10 has its handle end 14 extending upwardly and disposed adjacent the outer face of the camera. If by mistake the operator during the rotation of the finger engaging member 7, winds the film 4 too far, and it is desired to reverse the direction of the movement of the film 4, it will only be necessary for the operator to place a finger in engagement with the handle end 14 of the dog 10 and rock said dog on its pivotal point $10^a$, thereby releasing the ratchet wheel 8 and allowing the operator to grasp the finger engaging member 5 and wind the film onto the supply roller 2 sufficiently to proper position the film, after which operation the pivoted dog 10 may be released for holding the ratchet 8 against rotation except in the direction of the arrow $a$ and only when the operator rotates the same through the medium of the member 7.

From the above it will be seen that a film controlling device for cameras is provided which is simple in construction and one wherein if desired the film may be moved in either direction.

The invention having been set forth what is claimed as new and useful is:—

The combination with a camera having a film supply roller and a film accumulation roller, of handle members carried by said rolls, whereby said rolls may be rotated, a ratchet wheel carried by one of said rollers and disposed within a depression in one side of the camera, said depression having an offset portion to one side thereof, a spring actuated dog pivoted in said depressions where they communicate with each other and cooperating with the ratchet wheel, one end of said pivoted dog extending through the offset depression and provided with a finger engaging member overlying the side of the camera whereby said dog may be thrown out of engagement with the ratchet wheel and held out of engagement therewith, thereby allowing the ratchet carried roller to be reversely rotated.

In testimony whereof I have signed my name to this specification in the presence of two subscribing witnesses.

VICTOR G. PAUTLER.

Witnesses:
FRANK B. PAUTLER,
WM. M. SCHUWERK.